US011968638B2

(12) United States Patent
Smith et al.

(10) Patent No.: US 11,968,638 B2
(45) Date of Patent: Apr. 23, 2024

(54) PROVIDING A CLOCK VALUE TO A CLIENT DEVICE

(71) Applicant: Cisco Technology, Inc., San Jose, CA (US)

(72) Inventors: Malcolm Muir Smith, Richardson, TX (US); Jerome Henry, Pittsboro, NC (US); Sanjay Katabathuni, Fremont, CA (US)

(73) Assignee: Cisco Technology, Inc.

( * ) Notice: Subject to any disclaimer, the term of this patent is extended or adjusted under 35 U.S.C. 154(b) by 0 days.

(21) Appl. No.: 17/721,070

(22) Filed: Apr. 14, 2022

(65) Prior Publication Data

US 2022/0361126 A1 Nov. 10, 2022

Related U.S. Application Data

(60) Provisional application No. 63/185,693, filed on May 7, 2021.

(51) Int. Cl.
*H04W 56/00* (2009.01)
*H04W 88/08* (2009.01)

(52) U.S. Cl.
CPC ... *H04W 56/0015* (2013.01); *H04W 56/0035* (2013.01); *H04W 56/005* (2013.01); *H04W 88/08* (2013.01)

(58) Field of Classification Search
CPC ......... H04W 56/0015; H04W 56/0035; H04W 56/005; H04W 88/08
See application file for complete search history.

(56) References Cited

U.S. PATENT DOCUMENTS

| 9,763,074 B2* | 9/2017 | Park | H04L 27/261 |
| 2015/0063228 A1* | 3/2015 | Aldana | H04W 48/12 |
| | | | 370/329 |
| 2015/0257028 A1* | 9/2015 | Chu | H04W 4/38 |
| | | | 370/252 |
| 2015/0282079 A1* | 10/2015 | Alon | H04W 40/005 |
| | | | 370/311 |
| 2015/0350027 A1* | 12/2015 | Raissinia | H04L 41/12 |
| | | | 455/517 |
| 2016/0021496 A1* | 1/2016 | Tamhane | H04W 24/10 |
| | | | 455/456.2 |
| 2016/0345277 A1* | 11/2016 | Segev | H04W 56/001 |
| 2016/0366660 A1* | 12/2016 | Segev | H04W 24/08 |
| 2017/0048671 A1* | 2/2017 | Marri Sridhar ... | H04W 56/0015 |
| 2017/0180933 A1* | 6/2017 | Steiner | H04W 4/023 |
| 2018/0109970 A1* | 4/2018 | Chu | H04W 4/38 |
| 2018/0310133 A1* | 10/2018 | Ramasamy | G01S 5/0242 |

(Continued)

OTHER PUBLICATIONS

Val, Iñaki et al.; "IEEE 802.1AS Clock Synchronization Performance Evaluation of an Integrated Wired-Wireless TSN Architecture", (https://arxiv.org/) Aug. 2021; 12 pages.

(Continued)

*Primary Examiner* — Bailor C Hsu

(74) *Attorney, Agent, or Firm* — Merchant & Gould P.C.

(57) ABSTRACT

A host clock value may be provided to a client device. An Access Point (AP) may obtain a Timing Synchronization Function (TSF)-based time stamp. Next, the TSF-based time stamp may be placed in an Information Element (IE) that was intended to contain follow up information. The IE may then be transmitted.

20 Claims, 7 Drawing Sheets

(56) References Cited

U.S. PATENT DOCUMENTS

2019/0386763 A1* 12/2019 Rentschler .............. H04L 12/28
2020/0127751 A1   4/2020 Itagaki et al.
2021/0258136 A1   8/2021 Hoffleit et al.

OTHER PUBLICATIONS

Mildner, Alexander, "Time Sensitive Networking for Wireless Networks—A State of the Art Analysis"; (Seminar IITM WS 18/19, Network Architectures and Services); May 2019; 5 pages.

* cited by examiner

PROVIDING A CLOCK VALUE TO A CLIENT DEVICE

RELATED APPLICATION TECHNICAL FIELD

Under provisions of 35 U.S.C. § 119(e), Applicant claims the benefit of U.S. Provisional Application No. 63/185,693 filed May 7, 2021, which is incorporated herein by reference.

TECHNICAL FIELD

The present disclosure relates generally to providing a clock value to a client device.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
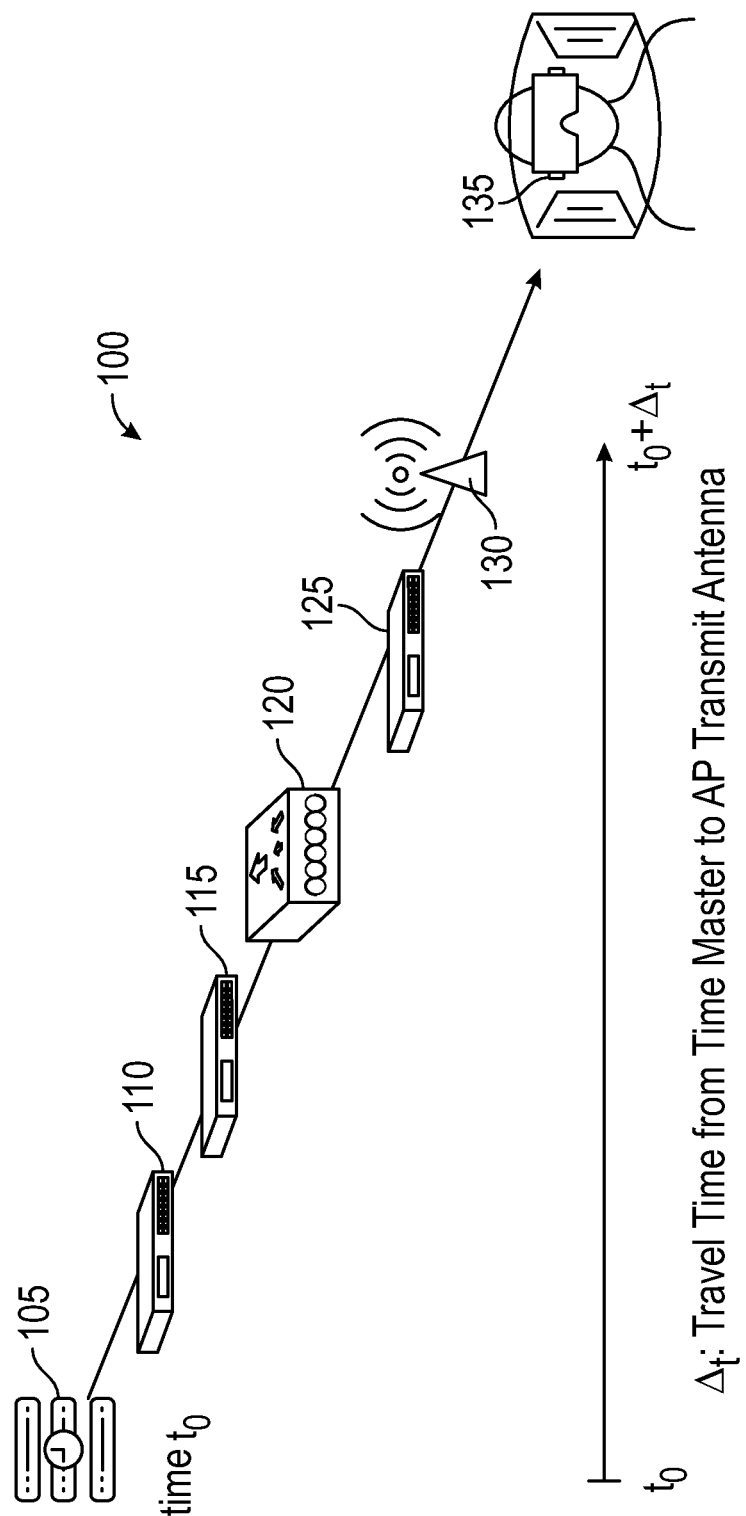
FIG. 1 is a block diagram of an operating environment.

A host clock value may be provided to a client device. An Access Point (AP) may obtain a Timing Synchronization Function (TSF)-based time stamp. Next, the TSF-based time stamp may be placed in an Information Element (IE) that was intended to contain follow up information. The IE may then be transmitted.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Wireless Time-Sensitive-Networks (WTSN) such as Wi-Fi may rely on the Electrical and Electronics Engineers (IEEE) 802.1AS standard Precision-Time-Protocol (PTP) for synchronizing a client device (e.g., a station (STA)) to an Access Point (AP). These protocols were developed by IEEE leveraging location technologies such as 802.11-2012 (TM) and 802.11-2016 (Fine Timing Measurement (FTM)) to estimate propagation delay and improve accuracy. Some approaches integrate the IEEE 802.1AS PTP domain and the FTM domain in a way that results in less overall accuracy. Embodiments of the disclosure may provide a solution to this basic accuracy problem.

FIG. 1 is a block diagram of an operating environment 100. As shown in FIG. 1, operating environment 100 may comprise a time server 105, a first switch 110, a second switch 115, a Wireless Local Area Network (WLAN) controller 120, a third switch 125, an AP 130, and a client device 135. Client device 135 may comprise, but is not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), a Virtual reality (VR)/Augmented reality (AR) device, or other similar microcomputer-based device.

Using the IEEE 802.11 AS standard with FTM protocol, an IEEE 802.11 AS process on client device 135 may initiate a Medium Access Control (MAC) Sublayer Management Entity (MLME)-FINETIMNINGMSMT.request to the Wi-Fi interface in order to synchronize client device 135's clock with AP 130's. This may be accomplished by computing the FTM propagation delay from standard exchange of FTM measurement frames with associated timestamps (e.g., $t_1$, $t_4$) and the IEEE 802.1AS followUpinformation Information Elements (IEs) (i.e., preciseOriginTimeStamp and a correctionField (initially unset)). This is done in order to represent the offset between time server 105's master time-stamp (represented by to) and the actual time at which the IEEE 802.11 AS values are transmitted by AP 130's Wi-Fi interface to client device 135 as shown in FIG. 1 (i.e., $t_0 + \Delta_t$).

Figure 2:
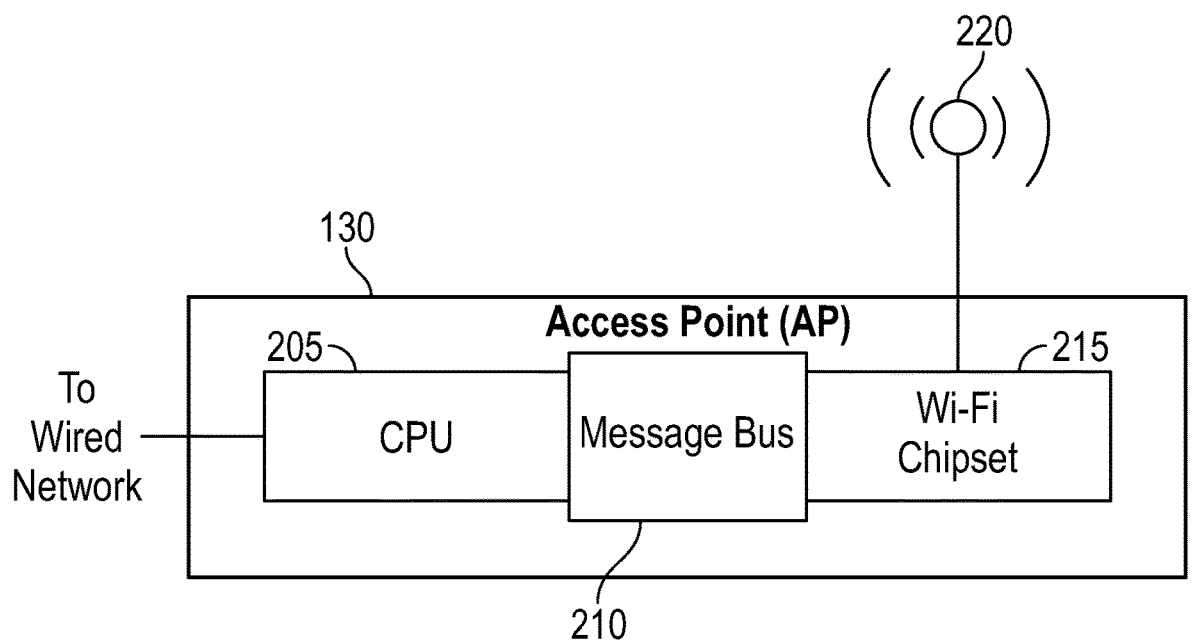
FIG. 2 is a block diagram of an Access Point (AP)

FIG. 2 illustrates AP 130 is more detail. As shown in FIG. 2, AP 130 may comprise a Central Processing Unit (CPU) 205, a message bus 210, a Wi-Fi chipset 215, and an antenna 220. Wi-Fi chipset 215 and antenna 220 together may comprise the Wi-Fi interface of AP 130. As stated above, the aforementioned FTM process may allow client device 135 to compute its actual local system time T as preciseOriginTimeStamp+correctionField+FTM_delay $(((t_4-t_1)-(t_3-t_2))/2)$.

Figure 3A:
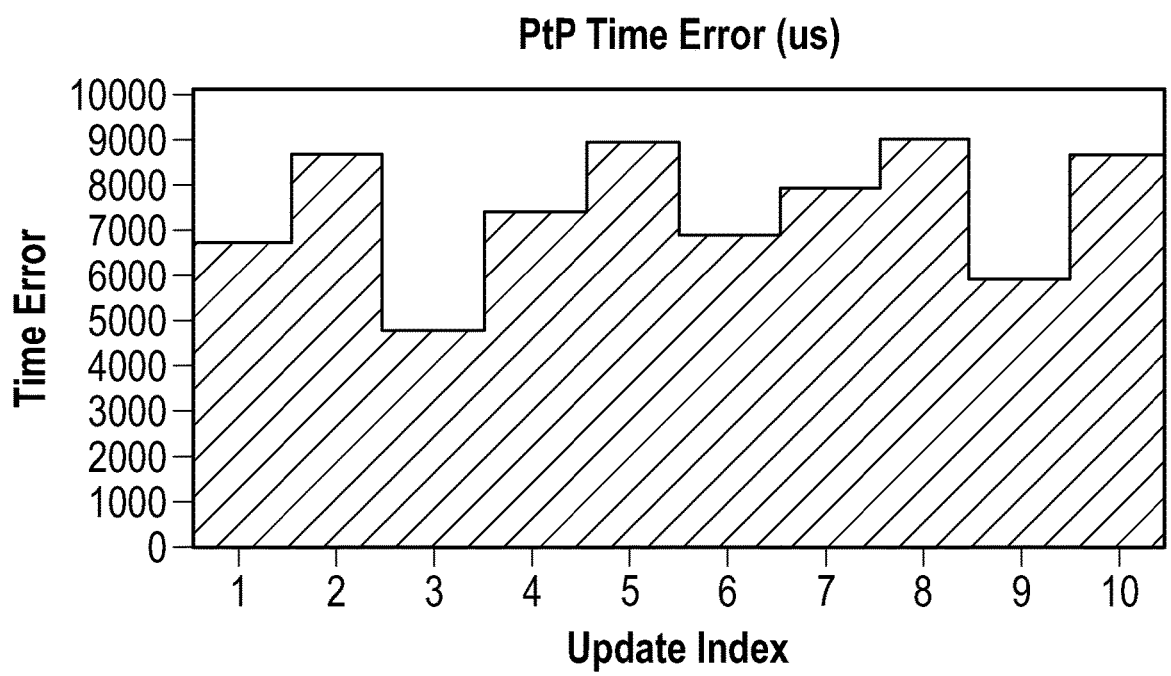
FIGS. 3A and 3B illustrate offset accuracy.
Figure 3B:
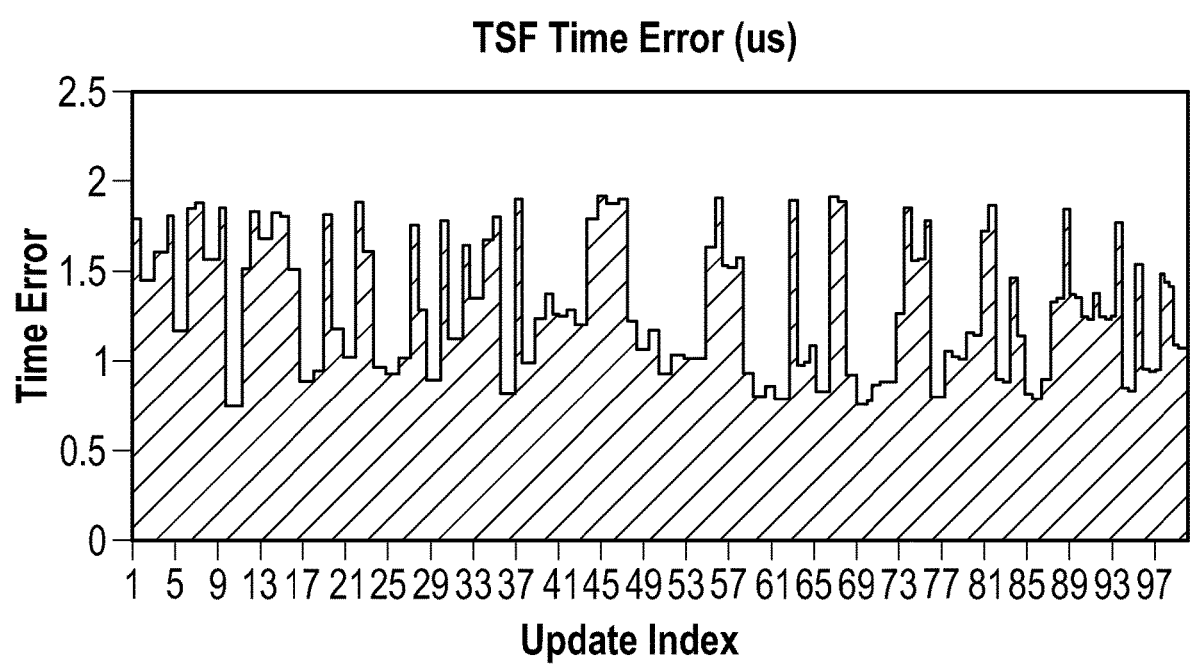

In an AP implementation, however, this offset may be variable and asymmetric because the processing and travel time from time server 105, through AP 130 may be hindered by multiple variable factors. For example, the travel time through message bus 210 may be variable and asymmetric. Also, the scale at which the Timing Synchronization Function (TSF) clock (used to derive the FTM timestamps) is sampled and the scale at which the IEEE 802.1AS PTP time (including the host AP reading of the preciseOriginTimeStamp and correctionField values) is sampled may be dramatically different, making the offset inaccurate (e.g., ms). This is illustrated by FIG. 3A and FIG. 3B.

The elements described above of operating environment 100 (e.g., AP 130, client device 135, CPU 205, and Wi-Fi chipset 215) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 8, the elements of operating environment 100 may be practiced in a computing device 800.

Figure 4:
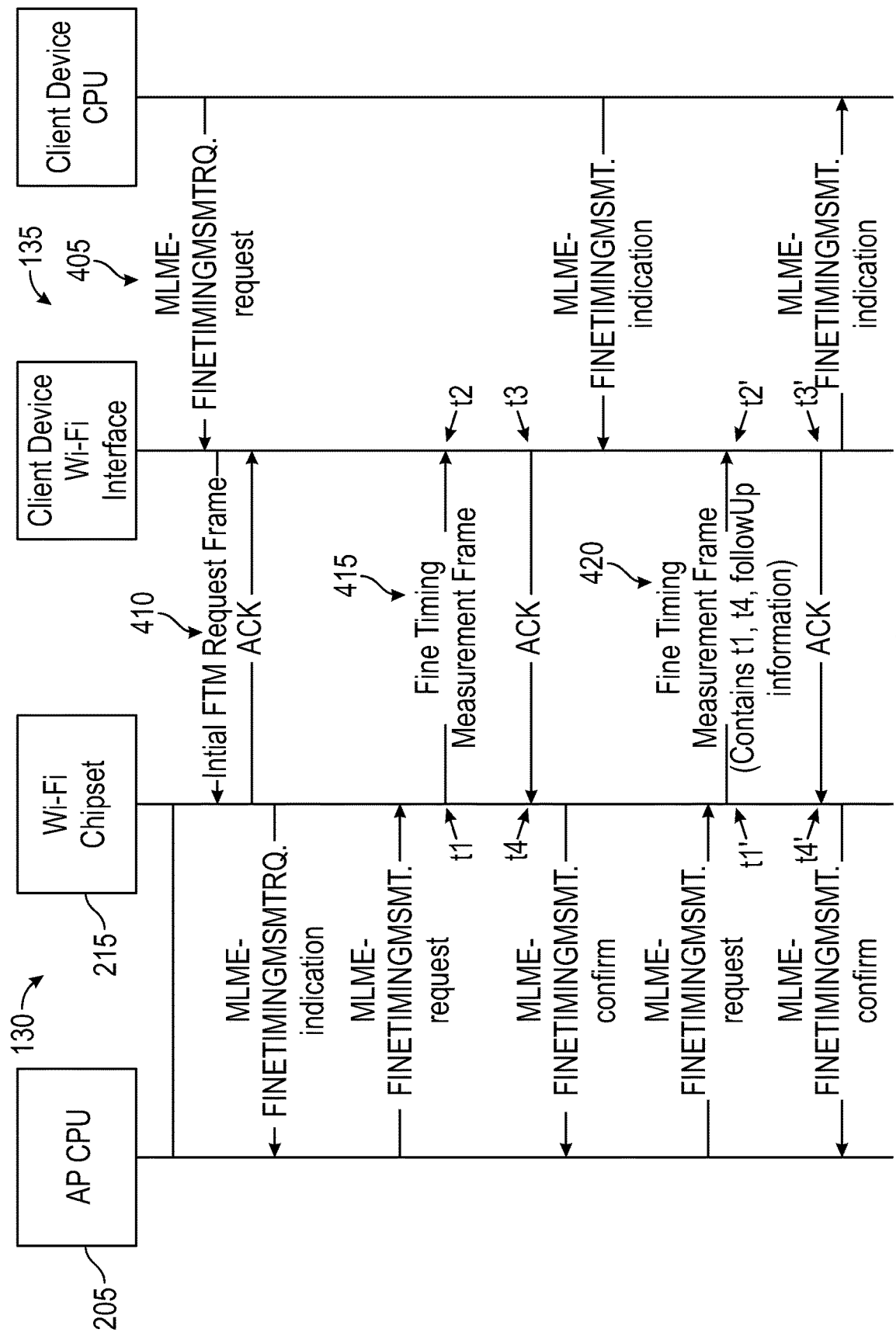
FIG. 4 illustrates a Fine Timing Measurement (FTM) process.

FIG. 4 illustrates the FTM process between AP 130 and client device 135. As shown in FIG. 4, client device 135 may need to synchronize its clock. Accordingly, client device 135 may initiate an IEEE 802.1AS process that may initiate a MLME-FINETIMINGMSMT.request to client device 135's Wi-Fi interface (stage 405). The IEEE 802.11 field that the MLME may process may be internal to a given system and may not be sent over the air to another entity. AP 130 may have synchronized its clock with an external source (e.g., time server 105), and thus AP 130's CPU 205 may be the master (with system time), and AP 130's Wi-Fi interface may be the MLME attached to the master with a running TSF clock. Client device 135's host CPU may be the slave (with its own system time) and client device 135's Wi-Fi interface may be the MLME attached to the slave with a running TSF clock. In the process illustrated by FIG. 4, an initial FTM request frame may be sent and acknowledged (stage 410). Then a first FTM measurement frame may be exchanged (stage 415). Next, a second FTM measurement frame may be exchanged to provide $t_1$, $t_4$, and follow up information (e.g., preciseOriginTimeStamp and a correctionField) (stage 420). However, as referenced above, the traversal time through message bus 210 may cause unpredictable delays and time inaccuracies in the follow up information.

This problem may be fundamental because most implementations of IEEE 802.11 may use Wi-Fi chipsets that separate the host Software (SW) and chipset Firmware (FW) via interrupts and other non-deterministic means. Accordingly, the theoretical IEEE 802.1AS+FTM scheme may fail in many implementations, embodiments of the disclosure may augment IEEE 802.1 AS over IEEE 802.11 by re-architecting the time source consistent with embodiments of the disclosure.

The Wi-Fi interface (FW/Hardware (HW)) may support accurate TSF (t) and system-time (T) alignment via generation of the Time Advertisement Information Element (IE) (i.e., IEEE 802.11 REVMD 9.4.2.60). This may provide a Time value (e.g., in ms), that when added to the corresponding TSF (e.g., in µs) in the same frame, may result in an accurate system time (T), for example, because no Interprocess Communication (IPC) interface (e.g., message bus 210) was crossed and no snapshotting may be needed between the two clocks.

Consequently, embodiments of the disclosure may replace the legacy IEEE 802.1 AS IE transmitted over subsequent FTM frames and carrying the follow up information (i.e., preciseOriginTimeStamp and correctionField values)) with a different IE. This different IE may carry the same intent, but may be built with a structure that may increase the accuracy by accounting for how the practical mechanics of IEEE 802.11 transmitters work.

In one embodiment, a time-stamp (T) in Coordinated Universal Time (UTC) format may be accurately computed by the Wi-Fi interface at the time of IEEE 802.1AS FTM request frame transmission and may then be related directly to its corresponding TSF timer (t) (i.e., an accurate snapshot). Accordingly, embodiments of the disclosure may replace the existing FollowUpinformation timestamps (i.e., preciseOriginTimeStamp and correctionField values) with these UTC time-stamps (maintained by FW) as per FIG. 7A below. Here the $T_1$ and $T_4$ UTC time-stamps correspond to the TSF times $t_1$ and $t_4$ respectively as per the standard FTM-based time calculation process above. Now instead of following the standard IEEE 802.1AS time calculation process for FTM, embodiments of the disclosure may provide an alternate more accurate process of computing absolute system time. This may be accomplished by having the IEEE 802.11AS peer (e.g., client device 135) snapshot it's local system (UTC) times, $T_2$ and $T_3$ corresponding to its local TSF values, $t_2$ and $t_3$, and thus with the $T_1$ and $T_4$ timestamps provided by the FollowUpinformation message, client device 135 may compute a local UTC system time offset: $(T_2+T_3)/2-(T_1+T_4)/2$.

Figure 7A:
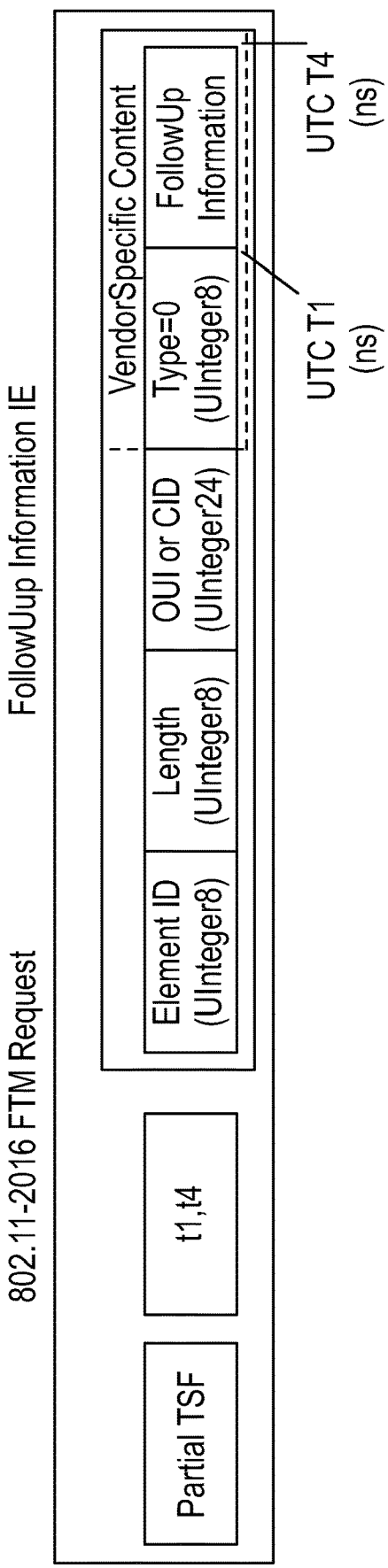
FIGS. 7A and 7B illustrate FTM frames.
Figure 7B:
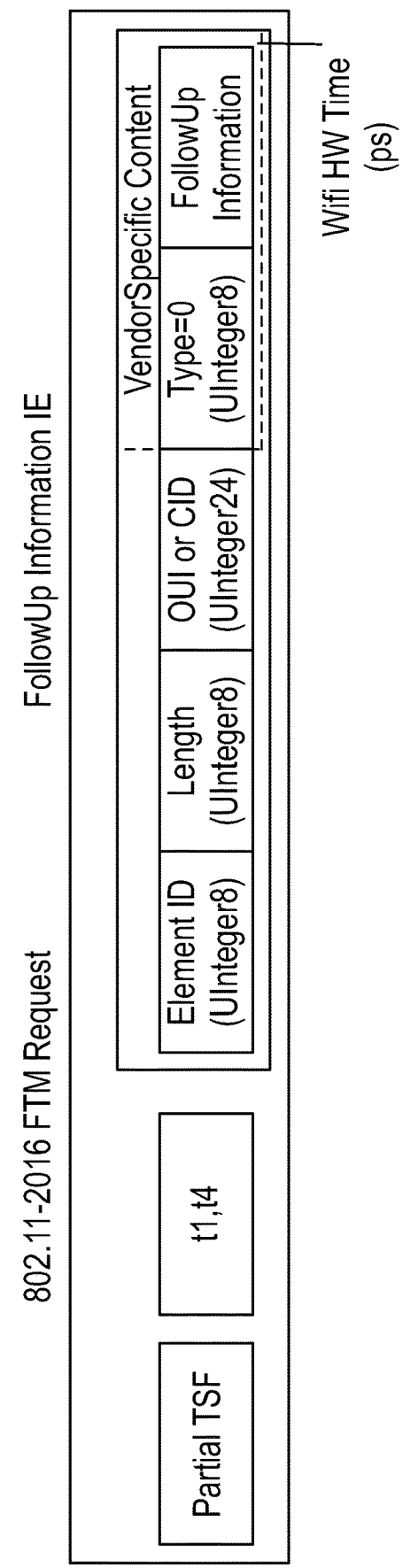

In another embodiment, the correctionField value may be excluded from the IEEE 802.11 AS FollowUpinformation. Client device 135 may then use the TSF in the same frame. The outcome may be that client device 135's computation of time (T) may now be highly accurate with a lower degree of complexity (e.g., as illustrated by FIG. 7B below).

Accordingly, embodiments of the disclosure may include a process to provide the AP host clock value to a client device in need of clock synchronization (with IEEE 802.1 AS-type accuracy). Processes consistent with embodiments of the disclosure may reduce the clock error by adapting the IEEE 802.1 AS intent into the IEEE 802.11 constraints, thus higher accuracy over a single exchange may be provided.

Figure 5:
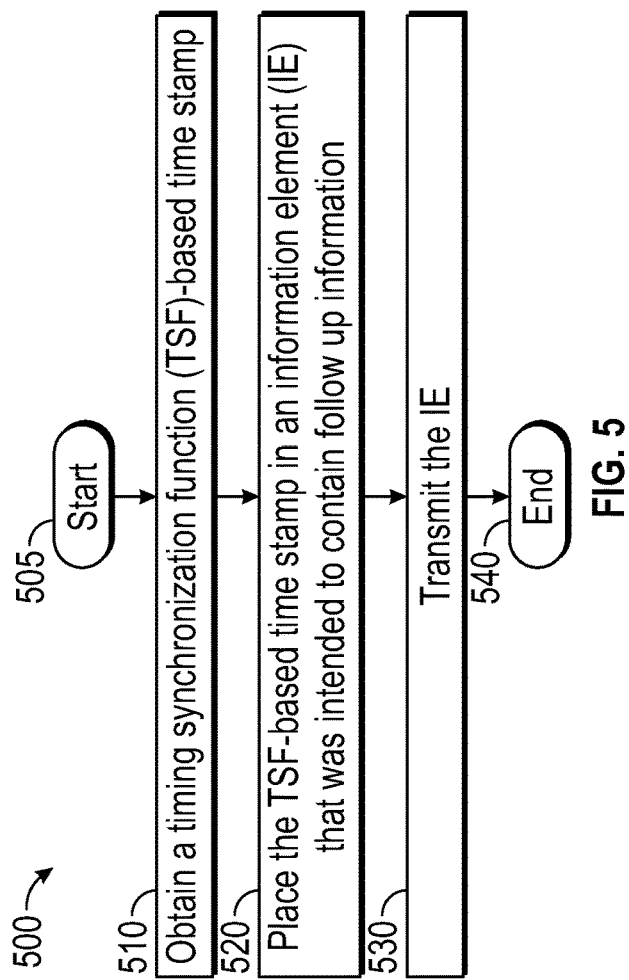
FIG. 5 is a flow chart of a method for providing a clock value to a client device.

FIG. 5 is a flow chart setting forth the general stages involved in a method 500 consistent with an embodiment of the disclosure for providing a clock value to a client device. Method 500 may be implemented using a computing device 800 as described in more detail below with respect to FIG. 8. In some embodiments, computing device 800 may comprise Wi-Fi chipset 215 of AP 130 for example. Ways to implement the stages of method 500 will be described in greater detail below.

Method 500 may begin at starting block 505 and proceed to stage 510 where computing device 800 may obtain a Timing Synchronization Function (TSF)-based time stamp. For example, a TSF-based time-stamps produced by Wi-Fi chipset 215 may be used. As stated above, the TSF timer may be more accurate than the time sent through the AP host (e.g., see FIG. 3A and FIG. 3B)).

From stage 510, where computing device 800 obtains the TSF-based time stamp, method 500 may advance to stage 520 where computing device 800 may place the TSF-based time stamp in an Information Element (IE) that was intended to contain follow up information. Conventional systems expect the system time to come in an Ethernet frame from a wired source (e.g., a time server), traverse an AP, and be transmitted in an 802.11/FTM frame via a Specific Information Element (VSIE) field to a client device. This may fail because the AP is not a switch with a single CPU. Traversal in an Application Specific integrated Circuit (ASIC) may be controlled by a single ASIC entity and thus may be predictable. However, an AP is not controlled by a single entity. Rather the AP has a host CPU on one side and a Wi-FI chipset on the other side. Traversing from the AP Ethernet interface, through the host CPU, through the message bus, and to Wi-FI chipset causes unpredictable delays and time inaccuracies in the order of several milliseconds for example.

Figure 6:
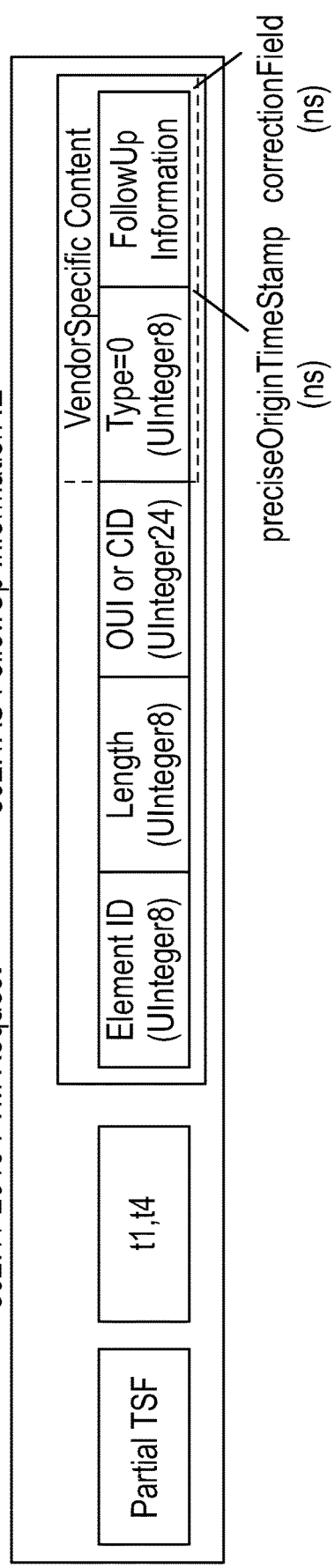
FIG. 6 illustrates an FTM frame.

To address the aforementioned problem, embodiments of the disclosure may replace the system clock time (e.g., received from time server 105 over the Ethernet) with a TSF-based time-stamps produced by Wi-Fi chipset 215 for example. The TSF timer may be more accurate than the time sent through the AP host (e.g., see FIG. 3A and FIG. 3B)). FIG. 6 illustrates an FTM frame used to communicate follow up information (i.e., preciseOriginTimeStamp and a correctionField).

Consistent with embodiments of the disclosure, a TSF-based UTC time-stamp may be used and refreshed (i.e., the Wi-Fi interface accurately snapshots UTC system time and TSF) at interval. For example, as shown in FIG. 7A, a time standard version of $t_1$ and $t_4$ from the FTM exchange may be placed in the follow up information of the IE rather than preciseOriginTimeStamp and correctionField. The time standard may comprise, but is not limited to, Coordinated Universal Time (UTC).

Consistent with other embodiments of the disclosure, the TSF timer of Wi-Fi chipset 215 may comprise its own system time source. For example, as shown in FIG. 7B, a time from the TSF timer of Wi-Fi chipset 215 may be placed in the follow up information of the IE rather than preciseOriginTimeStamp and a correctionField. With embodiments of the disclosure, the unpredictable interface (e.g., message bus 210) between the host (e.g., CPU 205) and Wi-Fi interface (e.g., Wi-Fi chipset 215) is not traversed.

Once computing device 800 places the TSF-based time stamp in an IE that was intended to contain follow up information in stage 520, method 500 may continue to stage 530 where computing device 800 may transmit the IE. For example, the IE may be transmitted from antenna 220 to client device 135. Consistent with embodiments of the disclosure, client device 135 may use the TSF-based time stamp from the follow up information in the IE (e.g., as shown in FIG. 7A and FIG. 7B) instead of expecting the traversing system time value.

At interval, client device 135 may communicate with a wired application server (e.g., connected to first switch 110, second switch 115, or third switch 125) and may learn its time delta (i.e., time on the application server versus time on client device 135). This delta may be learned and may compensate for the TSF versus client clock differences (e.g., in value and drift). Consistent with embodiments of the disclosure, because the TSF timer is more accurate than the time traversing the AP, the time synchronization precision maintained by client device 135 may be better. Once computing device 800 transmits the IE in stage 540, method 500 may then end at stage 540.

Figure 8:
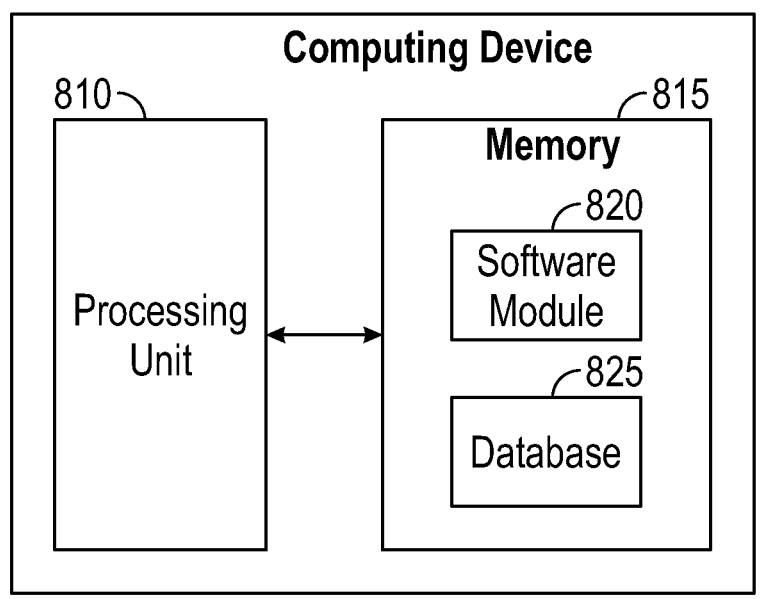
FIG. 8 is a block diagram of a computing device.

FIG. 8 shows a computing device 800. As shown in FIG. 8, computing device 800 may include a processing unit 810 and a memory unit 815. Memory unit 815 may include a software module 820 and a database 825. While executing on processing unit 810, software module 820 may perform, for example, processes for providing a clock value to a client device as described above with respect to FIG. 5. Computing device 800, for example, may provide an operating environment for the elements of FIG. 1. The elements of FIG. 1 may operate in other environments and are not limited to computing device 800.

Computing device 800 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 800 may comprise any computer operating environment, such as hand-held devices, multiprocessor systems, microprocessor-based or programmable sender electronic devices, minicomputers, mainframe computers, and the like. Computing device 800 may also be practiced in distributed computing environments where tasks are performed by remote processing devices. The aforementioned systems and devices are examples and computing device 800 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 800 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   obtaining, by an Access Point (AP), a Timing Synchronization Function (TSF)-based time stamp, wherein obtaining the TSF-based time stamp comprises:
   performing Fine Timing Measurement (FTM) exchange with a client device, and
   creating the TSF-based time stamp comprising a time standard version of $t_1$ and $t_4$ from the FTM exchange, wherein $t_1$ comprises a first Coordinated Universal Time (UTC) at sending of a FTM frame, and wherein $t_4$ comprises a second UTC time at receipt of an acknowledgment frame from the client device acknowledging receipt of the FTM frame;
   placing the TSF-based time stamp in an Information Element (IE) that was intended to contain follow up information; and
   transmitting the IE.

2. The method of claim 1, wherein obtaining the TSF-based time stamp comprises obtaining the TSF-based time stamp from a clock on a Wi-Fi chipset of the AP.

3. The method of claim 1, wherein obtaining the TSF-based time stamp comprises obtaining the TSF-based time stamp by a Wi-Fi chipset of the AP.

4. The method of claim 1, wherein the follow up information comprises a preciseOriginTimeStamp and a correctionField.

5. The method of claim 1, wherein the IE comprises an Electrical and Electronics Engineers (IEEE) 802.1AS IE.

6. The method of claim 1, further comprising:
   receiving the IE by the client device; and
   determining, by the client device, a difference between a time indicated by the TSF-based time stamp and a time on a server.

7. The method of claim 1, further comprising:
   receiving the IE by the client device;
   determining an actual local system time T at the client device as preciseOriginTimeStamp+correctionField+FTM_delay $(((t_4-t_1)-(t_3-t_2))/2)$, wherein $t_2$ comprises a third UTC at receipt of the FTM frame, and wherein $t_3$ comprises a fourth UTC time at sending of the acknowledgment frame from the client device acknowledging receipt of the FTM frame.

8. The method of claim 1, wherein performing the FTM exchange with the client device comprises:
   receiving an FM request frame from the client device;
   sending, in response to receiving the FTM request frame, the FTM frame; and
   sending the follow up information.

9. A system comprising:
   a memory storage; and
   a processing unit disposed in an Access Point (AP), the processing unit coupled to the memory storage, wherein the processing unit is operative to:
   obtain a Timing Synchronization Function (TSF)-based time stamp, wherein the processing unit being operative to obtain the TSF-based time stamp comprises the processing unit being operative to:
   perform Fine Timing Measurement (FTM) exchange with a client device, and
   create the TSF-based time stamp comprising a time standard version of $t_1$ and $t_4$ from the FTM exchange, wherein $t_1$ comprises a first Coordinated Universal Time (UTC) at sending of a FTM frame, and wherein $t_4$ comprises a second UTC time at receipt of an acknowledgment frame from the client device acknowledging receipt of the FTM frame;
   place the TSF-based time stamp in an Information Element (IE) that was intended to contain follow up information; and
   transmit the IE.

10. The system of claim 9, wherein the processing unit being operative to obtain the TSF-based time stamp comprises the processing unit being operative to obtain the TSF-based time stamp from a clock on a Wi-Fi chipset of the AP.

11. The system of claim 9, wherein the processing unit is disposed in a Wi-Fi chipset of the AP.

12. The system of claim 9, wherein the follow up information comprises a preciseOriginTimeStamp and a correctionField.

13. The system of claim 9, wherein the IE comprises an Electrical and Electronics Engineers (IEEE) 802.1AS Information IE.

14. The system of claim 9, wherein the processing unit being operative to perform the FTM exchange with the client device comprises the processing unit being operative to:
receive an FM request frame from the client device;
send, in response to receiving the FTM request frame, the FTM frame; and
send the follow up information.

15. A non-transitory computer-readable medium that stores a set of instructions which when executed perform a method executed by the set of instructions comprising:
obtaining, by Access Point (AP), a Timing Synchronization Function (TSF)-based time stamp, wherein obtaining the TSF-based time stamp comprises:
performing Fine Timing Measurement (FTM) exchange with a client device, and
creating the TSF-based time stamp comprising a time standard version of $t_1$ and $t_4$ from the FTM exchange, wherein $t_1$ comprises a first Coordinated Universal Time (UTC) at sending of a FTM frame, and wherein $t_4$ comprises a second UTC time at receipt of an acknowledgment frame from the client device acknowledging receipt of the FTM frame;
placing the TSF-based time stamp in an Information Element (IE) that was intended to contain follow up information; and
transmitting the IE.

16. The non-transitory computer-readable medium of claim 15, wherein the follow up information comprises a preciseOriginTimeStamp and a correction Field.

17. The non-transitory computer-readable medium of claim 15, wherein the IE comprises an Electrical and Electronics Engineers (IEEE) 802.1AS IE.

18. The non-transitory computer-readable medium of claim 15, further comprising:
receiving the IE by the client device; and
determining, by the client device, a difference between a time indicated by the TSF-based time stamp and a time on a server.

19. The non-transitory computer-readable medium of claim 15, further comprising:
receiving the IE by the client device;
determining an actual local system time T at the client device as preciseOriginTimeStamp+correctionField+ FTM_delay $(((t_4-t_1)-(t_3-t_2))/2)$, wherein $t_2$ comprises a third UTC at receipt of the FTM frame, and wherein $t_3$ comprises a fourth UTC time at sending of the acknowledgment frame from the client device acknowledging receipt of the FTM frame.

20. The non-transitory computer-readable medium of claim 15, wherein performing the FTM exchange with the client device comprises:
receiving an FM request frame from the client device;
sending, in response to receiving the FTM request frame, the FTM frame; and
sending the follow up information.

* * * * *